(12) United States Patent
Short

(10) Patent No.: US 11,185,927 B2
(45) Date of Patent: Nov. 30, 2021

(54) ULTRASONICALLY ASSISTED POWDER BED ADDITIVE MANUFACTURING

(71) Applicant: Edison Welding Institute, Inc., Columbus, OH (US)

(72) Inventor: Matthew A. Short, Wilmington, OH (US)

(*) Notice: Subject to any disclaimer, the term of this patent is extended or adjusted under 35 U.S.C. 154(b) by 319 days.

(21) Appl. No.: 16/443,165

(22) Filed: Jun. 17, 2019

(65) Prior Publication Data

US 2020/0001364 A1  Jan. 2, 2020

Related U.S. Application Data

(60) Provisional application No. 62/688,078, filed on Jun. 21, 2018.

(51) Int. Cl.
| | |
|---|---|
| *B22F 12/00* | (2021.01) |
| *B29C 64/141* | (2017.01) |
| *B33Y 40/00* | (2020.01) |
| *B33Y 30/00* | (2015.01) |
| *B22F 10/10* | (2021.01) |
| *B29C 64/227* | (2017.01) |
| *B29C 64/307* | (2017.01) |

(52) U.S. Cl.
CPC ............ *B22F 12/00* (2021.01); *B29C 64/141* (2017.08); *B22F 10/10* (2021.01); *B29C 64/227* (2017.08); *B29C 64/307* (2017.08); *B33Y 30/00* (2014.12); *B33Y 40/00* (2014.12)

(58) Field of Classification Search
CPC ..... B22F 12/00; B29C 64/141; B29C 64/307; B29C 64/227; B33Y 30/00; B33Y 40/00
See application file for complete search history.

(56) References Cited

U.S. PATENT DOCUMENTS

| | | | | |
|---|---|---|---|---|
| 2015/0041025 | A1* | 2/2015 | Wescott | B23K 26/356 |
| | | | | 148/538 |
| 2015/0266285 | A1* | 9/2015 | James | B33Y 40/00 |
| | | | | 419/28 |
| 2016/0325503 | A1* | 11/2016 | Mironets | B33Y 30/00 |
| 2017/0252860 | A1* | 9/2017 | Bamberg | B23K 15/0093 |
| 2018/0056588 | A1* | 3/2018 | Herzog | B29C 64/268 |
| 2019/0202007 | A1* | 7/2019 | Varetti | B29C 64/214 |

\* cited by examiner

*Primary Examiner* — Yung-Sheng M Tsui

(57) ABSTRACT

A powder bed fusion additive manufacturing system that includes a powder bed; a material powder, wherein the material powder includes individual grains; an apparatus for spreading the material powder across the powder bed in a layer-by-layer manner; and an ultrasonic device adapted to function in cooperation with the powder-spreading apparatus for compacting the material powder in each layer and distributing the individual grains in each layer of material powder in a substantially uniform manner.

6 Claims, 4 Drawing Sheets

ULTRASONICALLY ASSISTED POWDER BED ADDITIVE MANUFACTURING

CROSS-REFERENCE TO RELATED APPLICATIONS

This patent application claims the benefit of U.S. Provisional Patent Application Ser. No. 62/688,078 filed on Jun. 21, 2018 and entitled "Ultrasonically-Assisted Powder Bed Additive Manufacturing", the disclosure of which is hereby incorporated by reference herein in its entirety and made part of the present U.S. utility patent application for all purposes.

BACKGROUND

The described invention relates in general to additive manufacturing systems and processes and more specifically to systems, devices, and methods for enhancing and improving additive manufacturing processes through the inclusion and implementation of ultrasonics in such processes.

Additive manufacturing is an industrial process that enables the creation of components, parts, and devices that are stronger and lighter than those made by more traditional processes such as machining and casting. Additive manufacturing utilizes data computer-aided-design (CAD) software or three-dimensional object scanners for directing system hardware to deposit material, layer upon layer, in precise geometric shapes or patterns. As implied by its name, additive manufacturing adds successive superfine layers of material to create a three-dimensional object. Each successive layer bonds to the preceding layer of melted or partially melted material and different substances for layering material, including metal powder, thermoplastics, ceramics, composites, glass, and other materials may be used. Three-dimensional objects that are to be created are first digitally defined by computer-aided-design (CAD) software that is used to create specific digital files that essentially "slice" the modeled object into ultra-thin layers. This information is then used to guide the path of a nozzle or print head as it precisely deposits material upon a preceding layer. Alternately, a laser or electron beam selectively melts or partially melts in a bed of powdered material. As the material layers cool or are cured, they fuse together to form the desired three-dimensional object.

Additive manufacturing allows the creation of lighter, more complex designs that are either too difficult or too expensive to build using traditional dies, molds, milling and machining processes. Additive manufacturing is also excellent for rapid prototyping applications. Because the inherent digital-to-digital process eliminates traditional intermediate steps, it is possible to make design alterations in real-time. Whether additive manufacturing is used for prototyping or production, lead times are often significantly reduced. Intricate features, such as conformal cooling passages, may be incorporated directly into the design of a part. Parts that previously required assembly and welding or brazing of multiple pieces may be built as a single part, thereby providing greater strength and durability. By incorporating organic structures into designs, designer engineers may eliminate substantial weight while still maintaining the strength and integrity of a part.

Powder Bed Fusion (PBF) technology is used in a variety of additive manufacturing processes, including direct metal laser sintering (DMLS), selective laser sintering (SLS), selective heat sintering (SHS), electron beam melting (EBM) and direct metal laser melting (DMLM). These systems use lasers, electron beams or thermal print heads to melt and fuse ultra-fine layers of material powder for creating a part or component. PBF processes typically involve the spreading of powdered material over previously deposited layers of material using a roller, recoater arm, or coating blade, or the like. A hopper or a reservoir positioned below or next to the powder bed is used to provide fresh powdered material. As the process concludes, excess powder is blasted away from the object. Laser Powder Bed Fusion (L-PBF) is another additive manufacturing process in which a three-dimensional component or part is built using a layer-by-layer approach by utilizing a high-power laser. L-PBF typically involves the following general steps: (i) a layer of powdered material (e.g., metal), typically about 0.04 mm thick, for example, is spread over a build platform or plate; (ii) a laser fuses the first layer or first cross-section of the part; (iii) a new layer of powder is spread across the previous layer using a roller or similar device; (iv) further layers or cross sections are fused and added; and (v) the process is repeated until the entire part is created. Loose, unfused powdered material remains in position, but is removed during post processing.

Despite the multiple utilitarian aspects of additive manufacturing, there are system and process limitations that have created concerns within the additive manufacturing community. Some of these concerns involve powder deposition rates and distribution, density of manufactured structures, surface finish, microstructure, porosity, and the ability to generate tailored material properties throughout the entirety of a manufactured structure. As previously discussed, additive manufacturing systems commonly employ the use of a recoater arm that traverses across a build platform and deposits a thin layer of material powder, filler metal, polymer additive, binder, etc. Due to anomalies in powder grain size and shape, it is possible for individual grains to clump together and drag across the build surface or within the powder bed itself, thereby generating peaks or valleys of material within the bed. Furthermore, imperfections in the recoater arm or coating blade, create an increased likelihood of producing inconsistent and irregular surface patterns of powder distribution. These inconsistent patterns may result in the creation of voids during the bonding process. Accordingly, there is an ongoing need for systems, devices, and methods for effectively addressing such concerns.

SUMMARY

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

In accordance with one aspect of the present invention, a first powder bed fusion additive manufacturing system is provided. This powder bed fusion additive manufacturing system includes a powder bed; a material powder, wherein the material powder includes individual grains; an apparatus for spreading the material powder across the powder bed in a layer-by-layer manner; and an ultrasonic device adapted to function in cooperation with the powder-spreading apparatus for compacting the material powder in each layer and distributing the individual grains in each layer of material powder in a substantially uniform manner.

In accordance with another aspect of the present invention, a second powder bed fusion additive manufacturing system is provided. This powder bed fusion additive manufacturing system includes a powder bed; a material powder, wherein the material powder includes individual grains; a recoater arm or roller for spreading the material powder across the powder bed in a layer-by-layer manner; and an ultrasonic device adapted to function in cooperation with the recoater arm or roller for compacting the material powder in each layer and distributing the individual grains in each layer of material powder in a substantially uniform manner, wherein the ultrasonic device includes at least one ultrasonic transducer; and at least one sonotrode connected to the ultrasonic transducer.

In yet another aspect of this invention, a third powder bed fusion additive manufacturing system is provided. This powder bed fusion additive manufacturing system includes a powder bed; at least one material powder, wherein the at least one material powder includes individual grains; a recoater arm or roller for spreading the at least one material powder across the powder bed in a layer-by-layer manner; and an ultrasonic device adapted to function in cooperation with the recoater arm or roller for compacting the material powder in each layer and distributing the individual grains in each layer of material powder in a substantially uniform manner, wherein the ultrasonic device includes at least one ultrasonic transducer; at least one sonotrode connected to the ultrasonic transducer, wherein the at least one ultrasonic transducer and at least one sonotrode are mounted on the recoater arm or roller and tuned to be in resonance therewith.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides systems, devices, and methods for overcoming the aforementioned concerns and issues associated with powder bed fusion technologies used in additive manufacturing processes. This invention involves the excitation of the powder bed by one or more ultrasonic resonant devices, which alters the friction occurring between interacting powder grains of the material powder. Excitation of the powder bed either before, during, or after powder deposition generates a settling effect, whereby the material powder becomes more uniform and compact. Integrating high-power ultrasonics into conventional powder bed additive manufacturing systems for enhancing powder distribution promotes improved build density, surface finish, and the ability to create tailored material properties. Moreover, using high-power ultrasonics potentially facilitates a means to generate virgin powder-like builds with recycled powder.

Figure 1:
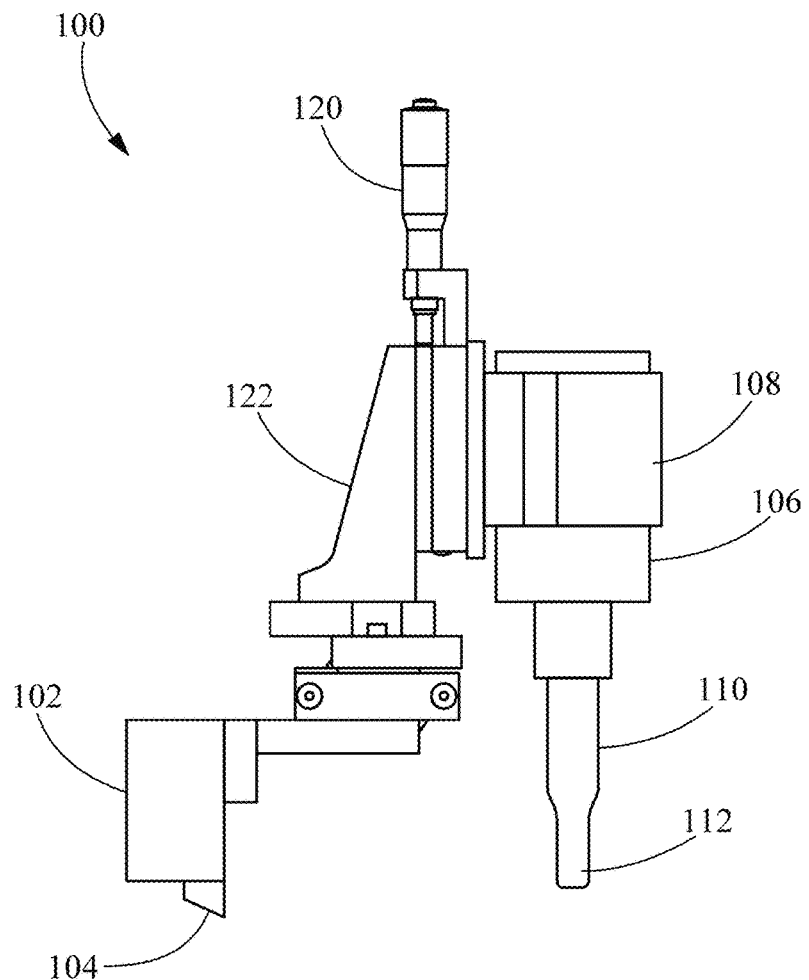
FIG. 1 is an illustration of an ultrasonically assisted powder bed fusion apparatus in accordance with a first embodiment of the present invention.

FIG. 1 provides an illustration of ultrasonically assisted powder bed fusion apparatus 100, wherein ultrasonic transducer 106 and sonotrode 110 have been incorporated into the material powder deposition assembly. The system shown in FIG. 1 includes separate recoater arm 102 upon which recoater arm blade 104 has been mounted. As part of sonotrode 110, subtle lead-in radii 112 or chamfer geometry (e.g., beveled or rounded edges) have been incorporated onto the powder contact face of sonotrode 110. Lead-in radii 112 redistribute powder along the face of sonotrode 110 while leveling out a thin layer of powder without creating a plowing effect. While sonotrode 110 is excited by an appropriate or predetermined level of resonance, the face contacting the material powder expands and contracts in a vertical manner. During the contraction phase, new material powder is presented at lead-in radii 112 and then compacted during the expansion phase. As recoater arm 102 traverses across the material powder, virgin powder is presented to lead-in radii 112 and is compacted in a continuous manner. The previously compacted powder is then further compacted by the horizontal flat face of sonotrode 110. During the expansion and contraction cycles imposed by the flat face of sonotrode 110, varying powder grain size and shape is redistributed in a more consistent manner and more compacted state. The ultrasonic excitation of sonotrode 110 generates a friction-reducing effect so that material powder grains can settle into crevices where such grains would not typically flow. The material powder is then further compacted at the completion of the expansion cycle. As shown in FIG. 1, exemplary apparatus 100 further includes transducer mount 108, micro-adjustment stage 120, and mount for recoater arm 122.

Most recoater arms are positioned just above the build surface and deposit a thin layer of material powder. In an illustrative example, a recoater blade was positioned to be 40 μm above the build platen. An ultrasonic sonotrode was then positioned an additional 10 μm above the build platen for a total standoff distance of 50 μm. The ultrasonic system was then adjusted so the compaction face of the sonotrode would deliver a displacement of 20 μm peak to peak amplitude. Therefore, when in resonance, a total of 60 μm of powder could be positioned underneath the compaction face and then be vibrated down 20 μm to a compacted depth of 40 μm. The deposition layer can be adjusted by increasing the recoater arm standoff distance and adjusting amplitude.

Figures 2A, 2B:
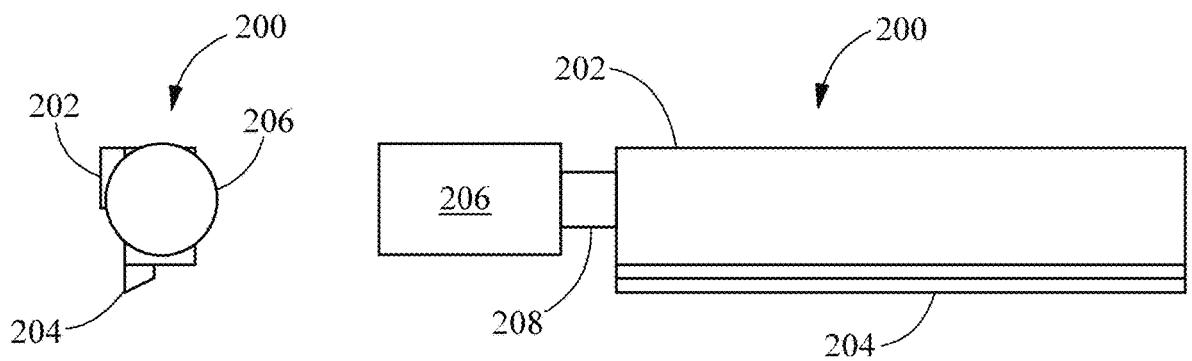
FIG. 2A is a side view of an ultrasonically assisted powder bed fusion apparatus in accordance with a second embodiment of the present invention and FIG. 2B is a front view of the ultrasonically assisted powder bed fusion apparatus of FIG. 2A.

FIGS. 2A-2B illustrate recoater arm assembly 200, wherein ultrasonic transducer 206 has been attached directly to recoater arm 202 in resonance therewith. Attaching transducer 206 directly to the recoater arm in this manner (e.g., through front mass 208) produces the same settling and compaction effect as the previously described embodiment. However, with this embodiment, recoater arm blade 204 includes a structural modification for incorporating the lead in geometry and horizontal flat face region of the sonotrode in the previously described embodiment. This is important because if a knife blade approach is used, micro peaks and valleys will result from the sinusoidal motion produced by ultrasound, thereby defeating or diminishing the desired effect of the ultrasonics.

Figure 3A:
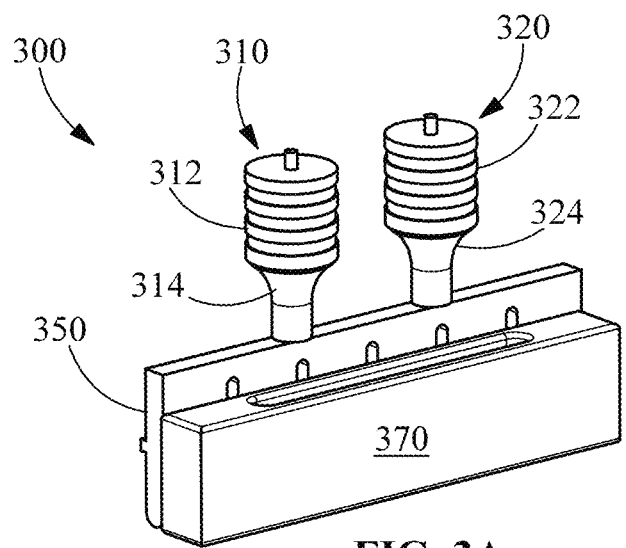
FIG. 3A is a perspective view of a first exemplary modular attachment configuration of the ultrasonic transducers, nodal mount sonotrode, and powder arm components of the present invention.
Figure 3B:
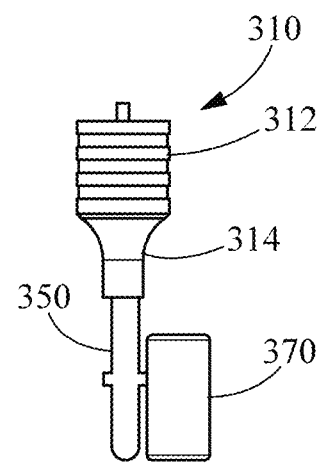
FIG. 3B is a side view of the configuration of FIG. 3A.

FIGS. 3A-3B illustrate an embodiment of the present invention wherein multiple ultrasonic transducers are attached to a nodal mount sonotrode (or ultrasonic resonant bar) which is mounted directly to the recoater arm that skims deposited powder as the recoater arm traverses across the powder bed. Amplitude can be increased or decreased as a means of tailoring the effect on friction between grains of material powder. In FIGS. 3A-3B, recoater arm assembly 300 includes first ultrasonic transducer 310 and second ultrasonic transducer 320. First ultrasonic transducer 310 further includes back mass 312 and front mass 314 and second ultrasonic transducer 320 further includes back mass 322 and front mass 324. Both front mass 314 and front mass 324 are connected directly to sonotrode 350, which is connected to recoater arm 370.

Figure 4A:
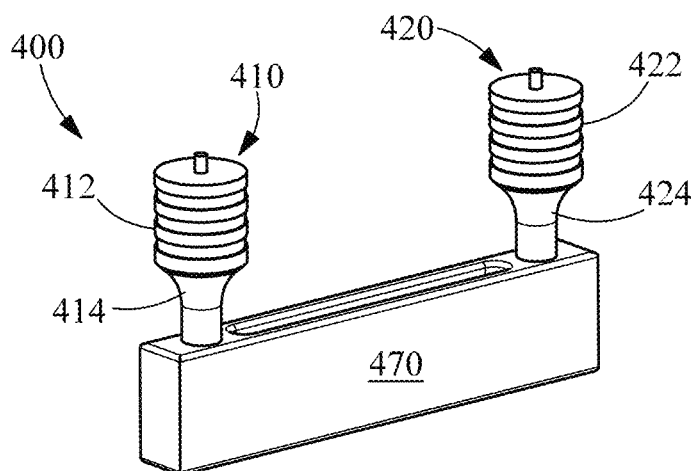
FIG. 4A is a perspective view of a second exemplary modular attachment configuration of the ultrasonic transducers and powder arm components of the present invention.
Figure 4B:
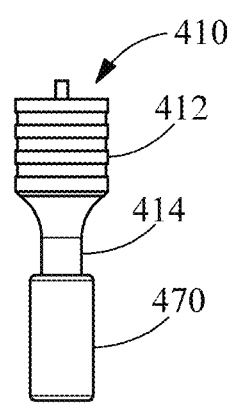
FIG. 4B is a side view of the configuration of FIG. 4A.

FIGS. 4A-4B illustrate an embodiment of the present invention wherein multiple ultrasonic transducers have been attached directly to the recoater arm. In this embodiment, the recoater arm (or powder deposition rail or sweep bar) is designed as a resonant body and tuned to a desired frequency. A high-power ultrasonic transducer is designed to be integrated with the recoater arm, thereby dispensing material powder while simultaneously ultrasonically exciting the grains of the material powder. In FIGS. 4A-4B, recoater arm assembly 400 includes first ultrasonic transducer 410 and second ultrasonic transducer 420. First ultrasonic transducer 410 further includes back mass 412 and front mass 414 and second ultrasonic transducer 420 further includes back mass 422 and front mass 424. Both front mass 414 and front mass 424 are connected directly to recoater arm 470.

Figure 5A:
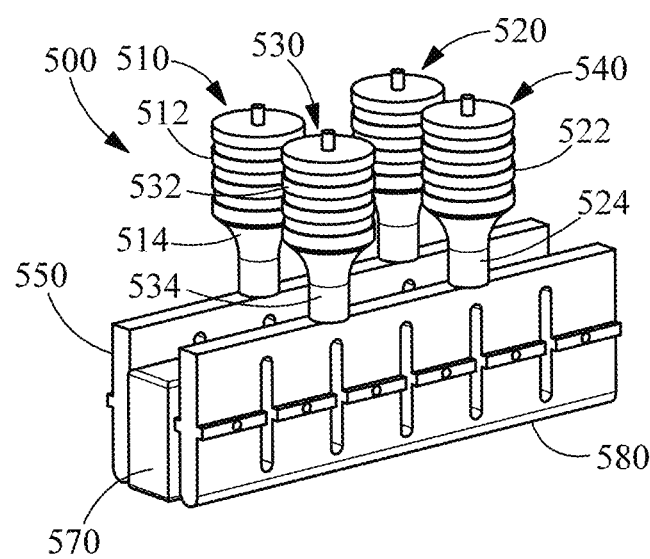
FIG. 5A is a perspective view of a third exemplary modular attachment configuration of the ultrasonic transducers, nodal mount sonotrode, and powder arm components of the present invention.
Figure 5B:
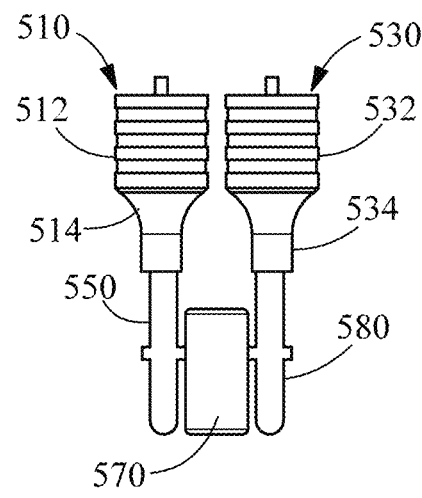
FIG. 5B is a side view of the configuration of FIG. 5A.

FIGS. 5A-5B illustrate an embodiment of the present invention wherein multiple ultrasonic transducers have been attached or affixed to multiple nodal mount sonotrodes, which have been attached to both sides of the recoater arm (powder deposition arm). Affixing an ultrasonically resonant bar to an existing recoater arm or powder deposition arm in this manner permits pre-processed material powder to be ultrasonically excited prior to being exposed to virgin powder. In FIGS. 5A-5B, recoater arm assembly 500 includes first ultrasonic transducer 510 and second ultrasonic transducer 520. First ultrasonic transducer 510 further includes back mass 512 and front mass 514 and second ultrasonic transducer 520 further includes back mass 522 and front mass 524. Both front mass 514 and front mass 524 are connected directly to first sonotrode 550, which is connected to recoater arm 570. Recoater arm assembly 500 also includes third ultrasonic transducer 530 and fourth ultrasonic transducer 540. Third ultrasonic transducer 530 further includes back mass 532 and front mass 534 and fourth ultrasonic transducer 540 further includes back mass 542 and front mass 544. Both front mass 534 and front mass 544 are connected directly to second sonotrode 580, which is connected to recoater arm 570. The embodiments shown in FIGS. 3A-3B and 5A-5B may be utilized in conjunction with one another to further enhance powder uniformity and density.

Figure 6:
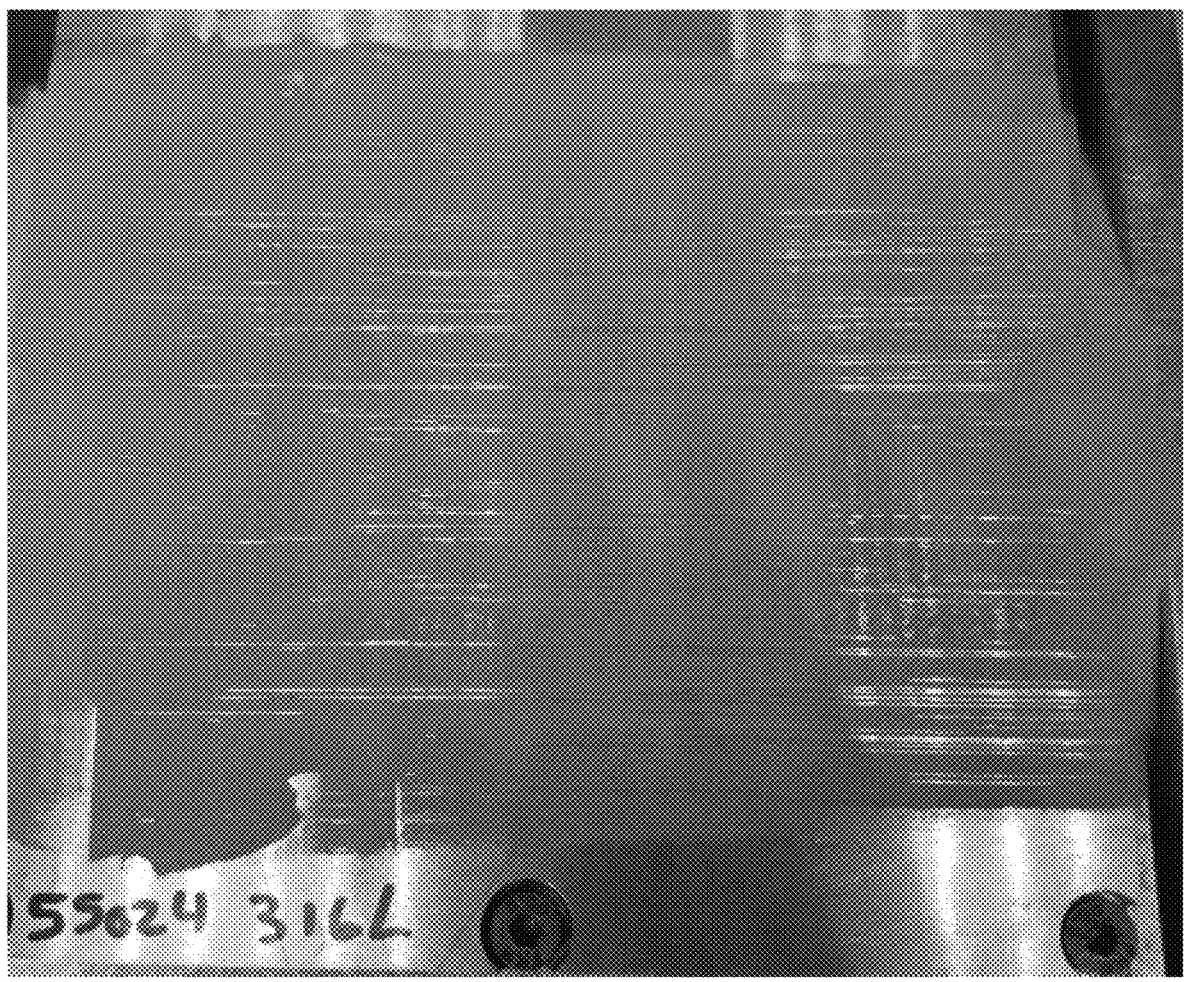
FIG. 6 is a photograph of the typical distribution of metal powder by the recoater arm of an ultrasonic additive manufacturing system.
Figure 7:
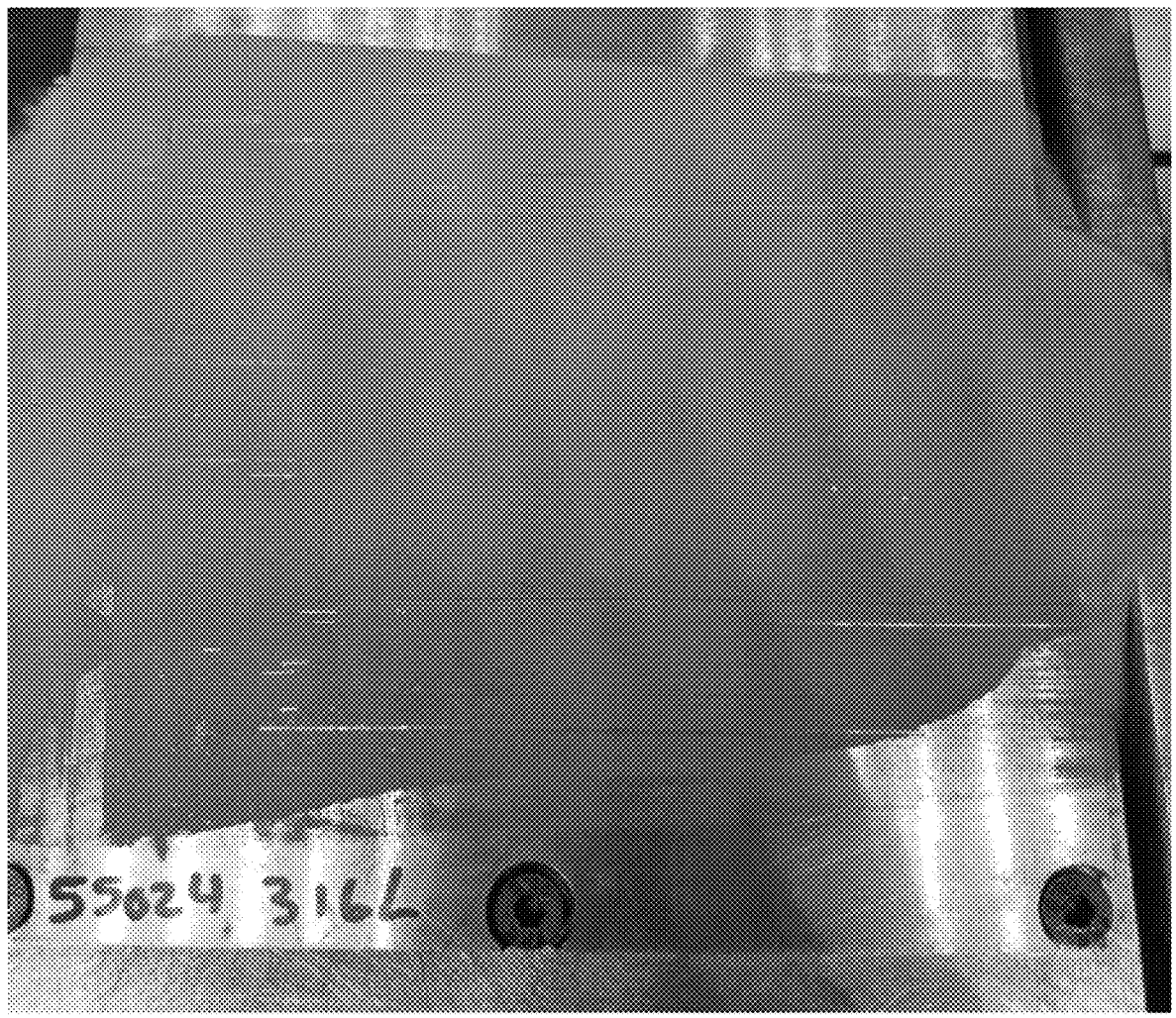
FIG. 7 is a photograph of the distribution of metal powder by the recoater arm of an ultrasonic additive manufacturing system after processing by the ultrasonic system of the present invention.

FIG. 6 provides a photograph of the typical distribution of metal powder by the recoater arm of an ultrasonic additive manufacturing system; and FIG. 7 provides a photograph of the distribution of metal powder by the recoater arm of an ultrasonic additive manufacturing system after processing by the ultrasonic system of the present invention. As seen in FIG. 6-7, the use of ultrasound on a powder bed has a significant effect on the uniformity of powder deposited by a recoater arm.

In summary, the present invention includes the following features and advantages: (i) ultrasonic excitation of the powder deposition arm for enhanced compaction and repeatability of powder bed characteristics; (ii) ultrasonic assisted powder deposition using nodal mount sonotrodes for enhanced compaction of the powder bed isolated from the powder deposit arm as not to affect ancillary devices or hardware; (iii) integration of ultrasonic energy for pre and post-processing of the powder bed for improved surface finish and density; and (iv) integration of dual ultrasonic assisted powder deposition whereby amplitude is controlled as a mechanism for producing tailored build quality.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A powder bed fusion additive manufacturing system, comprising:
   (a) a powder bed;
   (b) a material powder, wherein the material powder includes individual grains;
   (c) a recoater configured to spread the material powder across the powder bed in a layer-by-layer manner; and (d) an ultrasonic device connected to the recoater, wherein the ultrasonic device comprises at least one sonotrode.

2. The system of claim 1, wherein the powder bed fusion additive manufacturing system is an electron beam or laser-based additive manufacturing system.

3. The system of claim 1, wherein the material powder is a metal.

4. The system of claim 1, further comprising a blade mounted on the recoater arm.

5. The system of claim 1, wherein the at least one ultrasonic sonotrode further includes lead-in radii formed thereon at a predetermined location.

6. The system of claim 1, wherein the at least one ultrasonic sonotrode is acoustically tuned to be in resonance with the recoater.

* * * * *